3,455,482
SAFETY VALVE
Per Filip Andreas Asklund and Per Enar Lennart Frode, Oskarshamn, Sweden, assignors to Svenska Ackumulater Aktiebolaget Jungner, Oskarshamn, Sweden, a corporation of Sweden
Filed Nov. 29, 1966, Ser. No. 597,720
Claims priority, application Sweden, Dec. 22, 1965, 16,712/65
Int. Cl. B65d 51/16
U.S. Cl. 220—44
9 Claims

ABSTRACT OF THE DISCLOSURE

A safety valve for closed containers utilized as housings for galvanic cells wherein the safety valves are used to release an excess of pressure on the interior of the container. A central pin, which may serve as the main terminal of the cell, has supported thereon a spacing sleeve separating a lower plate which in turn supports a bushing arranged in sealing engagement with a centrally apertured membrane secured to the periphery of one end of the container. A container cover is similarly secured to the periphery of the container and engages the spacing sleeve so as to be mounted a spaced distance from the sealing membrane. An excess pressure within the container results in the upward and outward movement of the sealing membrane thereby separating it from the bushing and allowing the pressurized fluid to pass between the spacing sleeve and the membrane and out an aperture arranged in the cover member.

---

Figure 1:
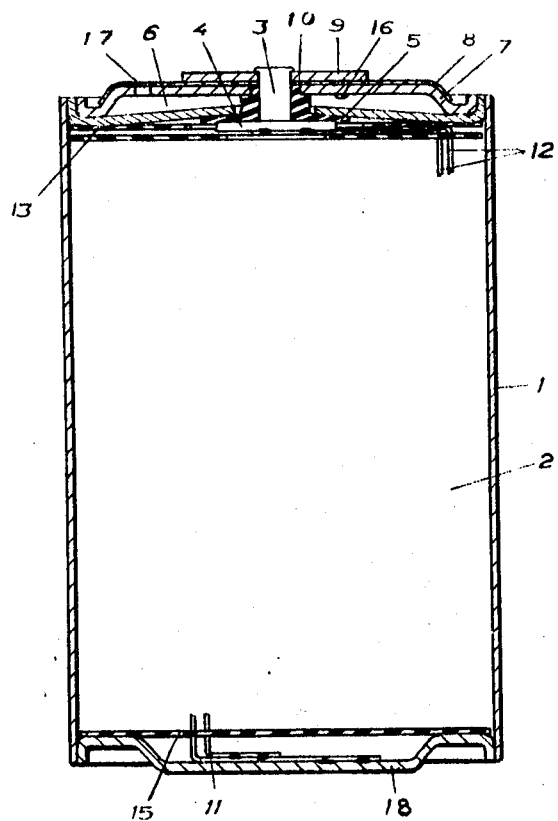

The invention relates to a safety valve for closed containers, particularly closed galvanic cells, i.e. primary and secondary cells. It is often necessary to secure closed containers against overpressure by means of a safety valve. Particularly in the case of small containers such safety valves have to meet very high requirements as to their compactness, reliability, simplicity of manufacture and cheapness. These requirements apply to a particularly large extent to closed galvanic cells which must necessarily be provided with a reliable, cheap safety valve. If such cells are used improperly, for instance if they are charged at too low a temperature or charged with reverse current or in case of a failure in the cell, there might occur a high pressure in the cell. Such cells are therefore generally provided with some kind of valve or burstplate.

An object of the present invention is to provide a safety valve which meets the above requirements. The valve in accordance with the invention is essentially characterized in that it comprises as a component at least a part of an essentially plane, comparatively rigid container cover which is connected with a membrane. The membrane is weaker than the cover and extends parallel inside the cover in spaced relationship to the cover, and the valve further comprises a pin or the like extending freely through the membrane and cover. The end of the pin facing the inside of the container is provided with a first stop member, in form of a plate for the edge portion of the membrane facing the pin hole through the membrane, as well as with a similar second stop member, in form of a washer for the edge portion of the container cover facing the pin hole through the cover. A gasket of resilient material extends between the first stop member and the membrane. The pin is so tensioned between the cover and the membrane that the gasket is subjected to an axial sealing pressure. This pin is suitably secured to the washer by rivetting and/or welding. A spacing sleeve may also suitably be provided on the pin between the cover and the plate and the length of the sleeve is chosen so as to ensure the required sealing pressure on the gasket. The spacing sleeve also preferably extends freely through the membrane with a clearance through which the overpressure gas from the container may escape after the pressure of the gasket has been reduced owing to inner overpressure acting upon the membrane. The container cover could also be provided with venting holes through which the space between the container cover and the membrane is communicating with the atmosphere.

According to a preferred embodiment of the invention the pin or like structure functioning as the safety valve also constitutes a main terminal of a closed galvanic cell, and it is therefore insulated from the container cover and the membrane and connected to one of the poles of the cell while the container is connected to the other pole. In this embodiment the spacing sleeve is preferably made of insulating material and may possibly be integral with the gasket which may be provided with a peripheral bead facing the membrane.

Figure 2:
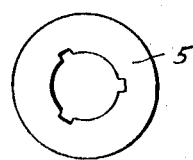
Figure 3:
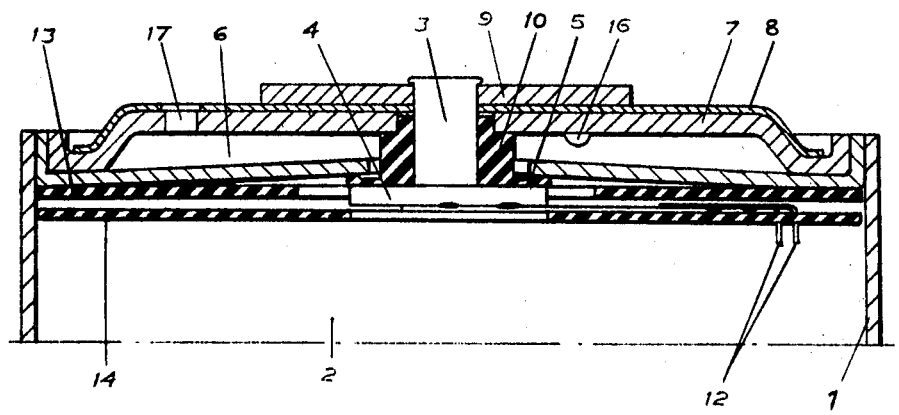

The invention will be more particularly described hereinafter with reference to the accompanying drawings, in which FIGURE 1 illustrates an embodiment of the invention applied to a closed galvanic cell seen in longitudinal section, FIGURE 2 shows a suitable gasket shape, and FIGURE 3 illustrates a modified embodiment of the invention applied to a closed galvanic cell.

In a cylindrical can formed by a cylinder 1 provided with a welded bottom 18 is mounted a group 2 of electrodes and separators. Said group may for instance be constituted by thin wound electrodes with separators therebetween.

A number of leads 11 are electrically connected to one or several electrodes of one polarity and welded to the bottom of the container. From the other electrode or electrodes a number of leads 12 are connected to a pin 3 provided with a plate 4. The plate abuts the gasket 5 of a resilient, electrical insulating material, e.g., an elastomer which in its turn lies against a membrane 6. The membrane 6 is provided with a hole, the diameter of which is smaller than the external diameters of the plate 4 and the gasket 5. The cell is provided with a cover 7 which together with the membrane 6 is tightly welded to the periphery of the container wall 1. An insulating cap 8 and a conductive washer 9 are placed on the cover, the pin 3 being secured to the washer 9 by rivetting and/or welding. A spacing sleeve 10 of insulating material extends between the plate 4 and the cover 7. The pin 3 and the washer 9 are being so compressed when being secured to each other, that the plate 4 and the cover 8 will abut the spacing sleeve 10, the length of which is so adjusted that the required opening pressure of the valve is ensured. The reference numerals 13, 14 and 15 designate insulating washers which prevent the cell from being short-circuited due to the lead 12 or the electrode to which it is connected coming into contact with the container of the other electrode. The cover 7 is provided with a number (e.g., 3) of downwardly projecting lugs 16 which limit the travel of the membrane. A hole 17 connecting the space between the container cover and the membrane with the atmosphere extends through the cover 7 and the insulating cap 8.

The cylinder 1, the bottom 18, the pin 3 with the plate 4, the membrane 6, the washer 9 and the cover 7 may be of nickel or steel, preferably stainless steel. The insulating cap 8 may be of phenoline resin impregnated-paper, fluorplastics or silicon-plastics.

FIGURE 2 shows a suitable embodiment of the gasket 5. The gasket is provided with a circular outer outline and a circular hole with three notches. This design ensures a guiding of the gasket 5 on the spacing sleeve 10 at the same time as it prevents the gasket from sealing when the membrane opens in case it should stick to the plate 4 or the membrane 6.

Alternatively, the spacing sleeve and the gasket may be made as an integral member as shown in FIGURE 3.

In this figure the same reference numerals have been used as for the corresponding parts in FIGURE 1. In order to provide a sufficiently small contact surface between the membrane and the gasket integral with the spacing sleeve, the periphery of the gasket member has been shaped as a bead facing the membrane. This shape provides a high sealing pressure which is necessary since the material in this case has to be comparatively hard, e.g., nylon or polypropyleneoxide. It is further suitable to provide a spacing sleeve 10 with internal ribs abutting the pin 3, the neck extending in the hole in the cover 7, being also constituted by a number of ribs. This design reduces the heat transfer between the pin 3 and the spacing member of the sleeve 10 so that the structure is less heat-sensitive, e.g., when the washer 9 is soldered or welded to the pin 3.

The valve shown on the drawings operates as follows:

In the assembling process the plate 4 is pressed against the cover 7 via the spacing sleeve 10 so that the plate 4 abuts the sleeve 10 and the sleeve abuts the cover 7. In doing so the membrane 6 is pressed towards the cover 7 so that the gasket 5 is subjected to a high sealing pressure. The pin 3 is thereafter secured to the washer 9. If the pressure inside the cell increases the membrane 6 bends outwardly and the sealing pressure is reduced. For a sufficiently high pressure in the cell the sealing pressure is low sufficiently that gas leaks out on one of the sides of the gasket 5, through the hole in the membrane 6 and the hole 17. Since the cover 7 is considerably more rigid than the membrane 6, the pin 3 and the spacing sleeve 10 will practically remain stationary relative the container 1. As the pressure drops due to the gas leaking out or being absorbed by the electrode group in the cell, the membrane is biased back and the valve resumes its sealing functions.

The valve according to the invention has many advantages. A whole cover or a part of it as large as required can be provided with a membrane so that a high sealing force as well as a great surface pressure is provided on the gasket 5. This ensures perfect sealing and reduces the risk of the gasket sticking on to the metal surfaces against which it is pressed. This is prevented due to the fact that a considerable gliding sideways occurs when the surface pressure is sufficiently high. When the pressure decreases the gasket shrinks again in a direction parallel to the metallic surfaces, so that the gasket shears off the metal surfaces even if a certain sticking has occurred. In case of low surface pressure the sticking force may often become greater than the surface pressure. A further advantage is that the valve can easily be arranged so that the pin 3 at the same time operates as a main terminal by insulating both the pin and the washer from the cover and the membrane as shown in the examples. By welding the rest of the cell it is possible to manufacture a cell with only two leak paths between the metal and the insulating material which is the minimum amount possible. This structure also gives great liberty to choose the material for the container and the valve. It is suitable to make all metallic parts (1, 3, 4, 6, 7, 9 and 18) of stainless steel. With helium shielded arc welding one obtains a reliable and tight weld around the whole edge. In this case soldering tags of nickel should be welded on the poles in order to provide connection facilities by means of tin soldering.

Although the invention has been described in connection with the embodiments shown on the drawing, it is obvious that many alterations or modifications may be made within the scope of the appending claims.

What we claim is:

1. A safety valve for sealed containers particularly sealed galvanic cells, comprising at least a part of a substantially plane, and substantially rigid container cover, having a central opening therein, a resilient membrane peripherally attached to but spaced from an inner surface of the cover, the membrane being provided with a central opening which is concentric with the opening in the cover, a rivet-like pin member having a head at one end facing the interior of the container and a cylindrical stem extending from said head through the openings in the cover and the membrane, said stem having an opposite end provided with a stop facing outwardly from the cover, a gasket of resilient material mounted between the head of the rivet-like member facing the inside of the container and the membrane, a spacing means between the cover and the interior facing head of the rivet-like member, the spacing means tensioned between the cover and the membrane such that the gasket is subjected to an axial sealing pressure, a seal formed between the gasket and the membrane whereby a predetermined excess pressure in the container results in forcing the resilient membrane towards the cover and the breaking of the seal between the gasket and the membrane such that the high pressure in the container is relieved.

2. A safety valve as in claim 1 wherein the stop of the rivet-like member facing the outside of the container comprises a metallic washer mechanically and electrically connected to the stem of the rivet-like member.

3. A safety valve as in claim 1 wherein the rivet-like member is electrically insulated from the cover and the membrane.

4. A safety valve as in claim 1, wherein the spacing means between the cover and the head of the rivet-like member comprises a hollow sleeve mounted concentrically around the rivet-like member.

5. A safety valve as in claim 4, wherein the spacing sleeve is mounted to extend freely through the central opening of the membrane thereby providing a clearance around the sleeve through which overpressure gas from the container may leak out whereby the pressure exerted on the gasket from within the container is decreased due to the inner overpressure inside the container acting on the membrane and displacing it from the gasket.

6. A safety valve as in claim 5, wherein venting holes are arranged in the cover through which the space between the cover and the membrane communicates with the atmosphere.

7. A safety valve as in claim 4, wherein the spacing sleeve is made of an electric insulating material.

8. A safety valve as in claim 4 wherein the spacing sleeve and the gaskets are an integral member.

9. A safety valve as in claim 8, wherein the periphery of the gasket is provided with a bead, facing the membrane and provides sealing engagement between the gasket and the membrane.

References Cited

UNITED STATES PATENTS

| | | | |
|---|---|---|---|
| 1,650,319 | 11/1927 | Briggs. | |
| 2,060,799 | 11/1936 | Drummond. | |
| 3,114,659 | 12/1963 | Warren | 136—178 |
| 3,278,340 | 10/1966 | Bell | 136—178 |
| 3,320,097 | 5/1964 | Sugalski | 136—178 |

WINSTON A. DOUGLAS, Primary Examiner

D. L. WALTON, Assistant Examiner

U.S. Cl. X.R.

136—178; 137—525.3